(12) United States Patent
Velasquez et al.

(10) Patent No.: US 7,235,151 B2
(45) Date of Patent: *Jun. 26, 2007

(54) ADHESIVE TRANSFER DEVICE

(75) Inventors: Joseph P. E. Velasquez, Gilbert, AZ (US); Paul J. Lemens, Scottsdale, AZ (US); Jerry L. Hardy, Scottsdale, AZ (US)

(73) Assignee: Xyron, Inc., Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/368,623

(22) Filed: Mar. 7, 2006

(65) Prior Publication Data

US 2006/0144505 A1    Jul. 6, 2006

Related U.S. Application Data

(62) Division of application No. 10/339,575, filed on Jan. 10, 2003, now Pat. No. 7,036,545, which is a division of application No. 09/691,042, filed on Oct. 19, 2000, now Pat. No. 6,576,080.

(60) Provisional application No. 60/160,631, filed on Oct. 20, 1999.

(51) Int. Cl.
    *B32B 37/20*    (2006.01)
(52) U.S. Cl. ...................... 156/300; 156/298
(58) Field of Classification Search ............... 156/299, 156/300, 301, 302, 298, 297, 234, 238, 230, 156/202, 523, 526, 527, 525, 522, 540, 541, 156/543, 574, 552, 579, 266, 555; 225/34, 225/6; 427/211

See application file for complete search history.

(56) References Cited

U.S. PATENT DOCUMENTS

| 2,191,704 A | 2/1940 | Bennett | 91/68 |
| 3,087,850 A | 4/1963 | Cole | 156/324 |
| 3,287,192 A | 11/1966 | Pohlenz | 156/3 |
| 3,343,978 A | 9/1967 | Engelbach | 117/76 |
| 3,698,990 A | 10/1972 | Shields | 156/522 |
| 3,949,935 A | 4/1976 | Stackig | 229/68 |
| 4,001,073 A | 1/1977 | Jones et al. | 156/516 |
| 4,094,719 A | 6/1978 | Jones et al. | 156/250 |
| 4,201,613 A | 5/1980 | Olivieri et al. | 156/270 |
| 4,285,999 A | 8/1981 | Olivieri et al. | 428/40 |
| 4,391,539 A | 7/1983 | Connoy | 400/208 |
| 4,419,175 A | 12/1983 | Bradshaw et al. | 156/554 |
| 4,531,690 A | 7/1985 | Condy | 242/197 |
| 4,643,789 A | 2/1987 | Parker et al. | 156/219 |
| 4,650,533 A | 3/1987 | Parker et al. | 156/219 |
| 4,680,073 A | 7/1987 | Brunner et al. | 156/250 |
| 4,718,971 A | 1/1988 | Summers | 156/540 |

(Continued)

FOREIGN PATENT DOCUMENTS

EP    0 264 270    4/1988

(Continued)

*Primary Examiner*—George Koch
(74) *Attorney, Agent, or Firm*—Pillsbury Winthrop Shaw Pittman, LLP

(57) ABSTRACT

The present application generally relates to adhesive transfer devices. One embodiment of the application discloses a hand-held actuatorless adhesive transfer device. Another embodiment of the application discloses an adhesive transfer device for applying adhesive to a side edge portion of a selected substrate.

3 Claims, 5 Drawing Sheets

U.S. PATENT DOCUMENTS

| | | | |
|---|---|---|---|
| 4,728,380 A | 3/1988 | Jones et al. | 156/230 |
| 4,859,512 A | 8/1989 | Jones et al. | 428/40 |
| 4,891,090 A | 1/1990 | Lorincz et al. | 156/577 |
| 4,950,517 A | 8/1990 | Loggins | 428/40 |
| 4,966,639 A | 10/1990 | Pfeffer et al. | 156/359 |
| 5,288,358 A | 2/1994 | Logan | 156/268 |
| 5,316,613 A | 5/1994 | Samuelson et al. | 156/540 |
| 5,383,996 A | 1/1995 | Dressler | 156/234 |
| 5,429,850 A | 7/1995 | Held | 428/40 |
| 5,441,785 A | 8/1995 | Liebe, Jr. | 428/41 |
| 5,445,696 A | 8/1995 | Krawczyk | 156/230 |
| 5,445,703 A | 8/1995 | Steeves et al. | 156/544 |
| 5,580,417 A | 12/1996 | Bradshaw | 156/495 |
| 5,605,730 A | 2/1997 | Treleaven | 428/40.1 |
| 5,788,796 A | 8/1998 | Look et al. | 156/277 |
| 5,795,735 A | 8/1998 | Lockerbie | 435/69.1 |
| 5,855,722 A | 1/1999 | Osaka | 156/277 |
| 5,902,440 A | 5/1999 | Jenkins | 156/257 |
| 5,961,779 A | 10/1999 | Bradshaw | 156/495 |

FOREIGN PATENT DOCUMENTS

| | | |
|---|---|---|
| EP | 0 275 670 | 7/1988 |
| EP | 0 795 357 | 2/1997 |
| WO | 94/23957 | 10/1994 |
| WO | WO98/14393 | 4/1998 |

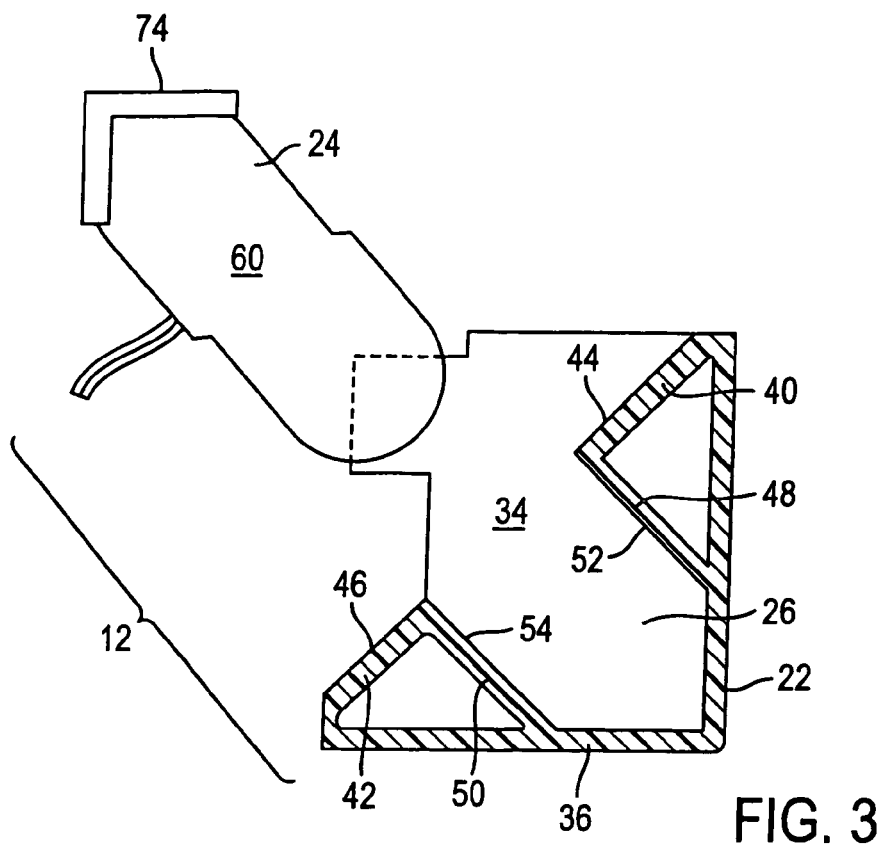
FIG. 3
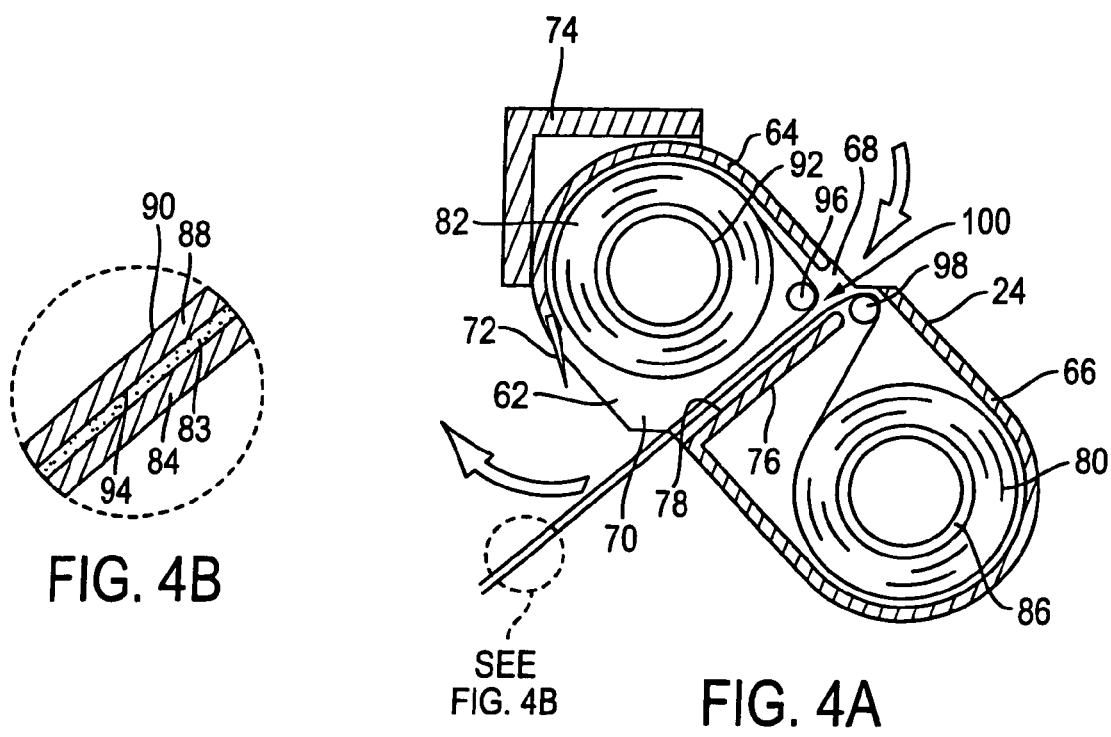
FIG. 4B
FIG. 4A

1

ADHESIVE TRANSFER DEVICE

The present application is a divisional of U.S. application Ser. No. 10/339,575, filed Jan. 10, 2003, now U.S. Pat. No. 7,036,545 which is a divisional of U.S. application Ser. No. 09/691,042, filed Oct. 19, 2000, now U.S. Pat. No. 6,576,080 which claims priority to U.S. Provisional Application No. 60/160,631, filed Oct. 20, 1999, the entirety of each being hereby incorporated in the present application by reference.

FIELD OF THE INVENTION

The present invention relates to an adhesive transfer device for applying adhesive to a selected substrate.

BACKGROUND AND SUMMARY OF THE INVENTION

U.S. Pat. Nos. 5,584,962 and 5,580,417 disclose devices that can be used for performing an adhesive transfer operation wherein pressure-sensitive adhesive is applied to one side of a selected substrate, such as a printed label or a photograph. These devices each comprise a frame, structure for mounting a set of supply rolls, a pair of nip rollers for applying pressure to the substrates being advanced therethrough, and a manual crank handle for imparting rotation to the nip rollers. One of the supply rolls carries a wound-up supply of an adhesive carrying substrate coated on one side thereof with a layer of pressure-sensitive adhesive. The other supply roll carries a wound-up supply of an adhesive mask substrate that has a greater affinity for adhesive bonding than the adhesive carrying substrate.

To perform an adhesive transfer operation using the devices of the aforementioned patents, the mask and adhesive carrying substrates are unwound and fed in between the nip rollers with the adhesive layer engaging the mask substrate. Then, the selected substrate is fed into the nip roller between the adhesive carrying and mask substrates and the user rotates the crank handle to rotate the nip rollers. The rotation of the nip rollers advances the substrates therethrough and discharges them out from the device. The rotation of the nip rollers also applies pressure to the substrates so that the adhesive bonds or adheres to the selected substrate and any portion of the mask substrate extending around the periphery of the selected substrate.

The user then cuts the bonded substrates and peels the mask substrate back from the adhesive carrying substrate to uncover the selected substrate. As the mask substrate is peeled back, any excess adhesive around the periphery of the selected substrate remains bonded to the mask substrate and is removed from the adhesive carrying substrate. Thus, the user can discard the mask substrate, and peel back the selected substrate for adherence to a contact surface as desired. Because the excess adhesive around the periphery of the selected substrate is removed along with the mask substrate, the portions of the adhesive carrying substrate are relatively clean, thereby reducing the potential for adhesive sticking to the user's hands as he/she peels back the selected substrate.

While the devices of the '962 and '417 patents have proven quite effective at the above-described adhesive transfer operation, the costs associated with purchasing these devices can be prohibitive for the occasional user who does not plan on using the device on a regular basis. To date, unless the occasional user is willing to invest in such a device, the only commercially available options are prior adhesive transfer devices, such as glue sticks or spray-on adhesives.

Furthermore, the commercial embodiments of the devices disclosed in the '962 and '417 patents use supply rolls that range between 8½ inches and 25 inches in axial length. For users that desire to make small labels, such as 2 inches by 2 inches, for example, these patented devices may not necessarily be the most cost-effective solutions. In other words, the user may end up with "too much" machine for his small label making needs.

Consequently, there exists a need in the art for a small, hand-held adhesive transfer device that can be manufactured at a low cost, which results in a lower cost machine for the ultimate end user.

It is therefore an object of the present invention to meet the above-described need. To achieve this object, one aspect of the invention provides a hand-held actuatorless adhesive transfer device for performing an adhesive transfer operation wherein adhesive is applied to a selected substrate. The device comprises a frame having a feeding side and a discharge side. The frame is sized and configured to be received in one hand of a user for manual handling and transport. A first supply roll is rotatably mounted within the frame and carries a wound up supply of an adhesive carrying substrate that has an adhesive carrying surface coated with a layer of pressure-sensitive adhesive. A second supply roll is rotatably mounted and carries a wound up supply of an adhesive mask substrate. The adhesive carrying substrate is unwound from the first supply roll with a lead end portion thereof extending outwardly from the discharge side of the frame. The mask substrate is unwound from the second supply roll with a lead end portion thereof extending outwardly from the discharge side of the frame adjacent the lead end portion of the carrying substrate.

The frame is constructed and arranged to enable the adhesive transfer operation to be initiated by manually grasping the frame with one hand and inserting a leading edge portion of the selected substrate between the adhesive carrying and mask substrates. The adhesive transfer device further comprising pressure applying structure constructed and arranged such that the adhesive transfer operation can be continued while continuing to manually grasp the frame with the one hand by manually grasping the lead end portions of the adhesive carrying and mask substrates at the discharge side of the frame with the other hand and manually pulling the lead end portions so as to advance the mask, adhesive carrying, and selected substrates together outwardly from the discharge side of the frame. The pressure applying structure applies pressure to the substrates being advanced through the device, thereby causing the pressure-sensitive adhesive on the adhesive carrying substrate to bond to the selected substrate.

Because the device constructed in accordance with this aspect of the invention is hand-held, material costs can be realized over the larger sized prior devices discussed above. Further, because the device is "actuatorless" and instead is operated by pulling on the lead end portion of the substrates, the manufacturing costs associated with making the actuator and connecting the same to associated components within the frame is obviated. Thus, the object of providing a low cost, hand-held adhesive transfer device has been effectively achieved.

Another disadvantage of the prior art devices discussed above is that they are not well-suited for applying adhesive to the edge of a selected substrate. For example, with a large window sign it may be desirable to apply adhesive only to the edge portions so as to make the sign easier to remove after mounting and to reduce the potential for residual adhesive sticking to the window glass. Instead, the device is adapted to apply adhesive over the entire substrate and the only plausible way of limiting the application of adhesive to the edge is by covering the portion that is not to receive adhesive with another substrate during the operation. However, performing such an operation is inefficient and ends up wasting the material used to cover the portion that is not to be adhered. Further, such an operation is not intuitive and it may not be appreciated by many users that such an option is available.

Consequently, there exists a need in the art for an adhesive transfer device that can be used to apply adhesive to the edge portion of a selected substrate. To achieve this object, another aspect of the invention provides an adhesive transfer device for performing an adhesive transfer operation wherein adhesive is applied to one side of a side edge portion of a selected substrate. The device comprises a frame having a feeding side and a discharge side. A first supply roll is rotatably mounted within the frame and carries a wound up supply of an adhesive carrying substrate that has an adhesive carrying surface coated with a layer of pressure-sensitive adhesive. A second supply roll is rotatably mounted within the frame and carries a wound up supply of an adhesive mask substrate that has a mask surface.

The frame has a substrate receiving opening extending from the feeding side thereof to the discharge side thereof and opening to an exterior of the frame. The substrate receiving opening is positioned and configured to enable a corner portion of the selected substrate at which a leading edge portion and the side edge portion of the selected substrate intersect to be inserted between the adhesive carrying and adhesive carrying and mask substrates. The opening may be of any size and configuration so long as the side edge of the selected substrate can be inserted between the substrate. The device further comprises pressure applying structure constructed and arranged such that the adhesive transfer operation can be performed by inserting the corner portion of the selected substrate between the adhesive carrying and mask substrates with a portion of the selected substrate extending outwardly from the substrate receiving opening and then advancing the mask substrate, the adhesive carrying substrate, and the side edge portion of the selected substrate together through the device and outwardly from the discharge side of the frame. The pressure applying structure applies pressure to the substrates being advanced through the device, thereby causing the pressure-sensitive adhesive on the adhesive carrying substrate to bond to the selected substrate.

Besides being capable of applying adhesive to a single edge of a selected substrate, the device of this aspect of the invention can allow for entire adhesive coverage for a selected substrate that is approximately twice the width normally accommodated by the device. Specifically, the user first applies adhesive using the device to one side edge of the selected substrate so that the adhesive covers about one-half the substrate. Then, the user flips the substrate around and applies adhesive using the device to the other side edge of the selected substrate so that the other half of the substrate is covered.

It should be noted that this aspect of the invention is not limited to the hand-held and actuatorless feature of the earlier aspect of the invention. To the contrary, this aspect of the invention may be practiced on an adhesive transfer device of any size with or without an actuator. For example, the substrate receiving opening feature of this aspect of the invention may be used with either of the above-mentioned U.S. Pat. Nos. 5,584,962 or 5,580,417, or U.S. patent application of Ensign, Ser. No. 09/564,587, filed May 5, 2000, the entirety of which are hereby incorporated into the present application in their entirety. In the arrangements of these incorporated patents, the nip rollers would correspond to the pressure applying structure.

Other objects, features and advantages of the present invention will become apparent from the following detailed description, the accompanying drawings and the appended claims.

BRIEF DESCRIPTION OF THE DRAWINGS

FIG. 3 is a partial cross-section view taken along line 3-3 of FIG. 2 with a cartridge that carries the supply rolls inserted into the main frame portion, the cartridge being shown in a full profile view rather than in cross-section;

FIG. 4 is a cross-sectional view of the cartridge isolated from the remaining components of the device with the section being along line 3-3 of FIG. 2 and with the lead end portions of the adhesive carrying and mask substrates shown in closer detail;

DETAILED DESCRIPTION OF THE INVENTION

Figure 1:
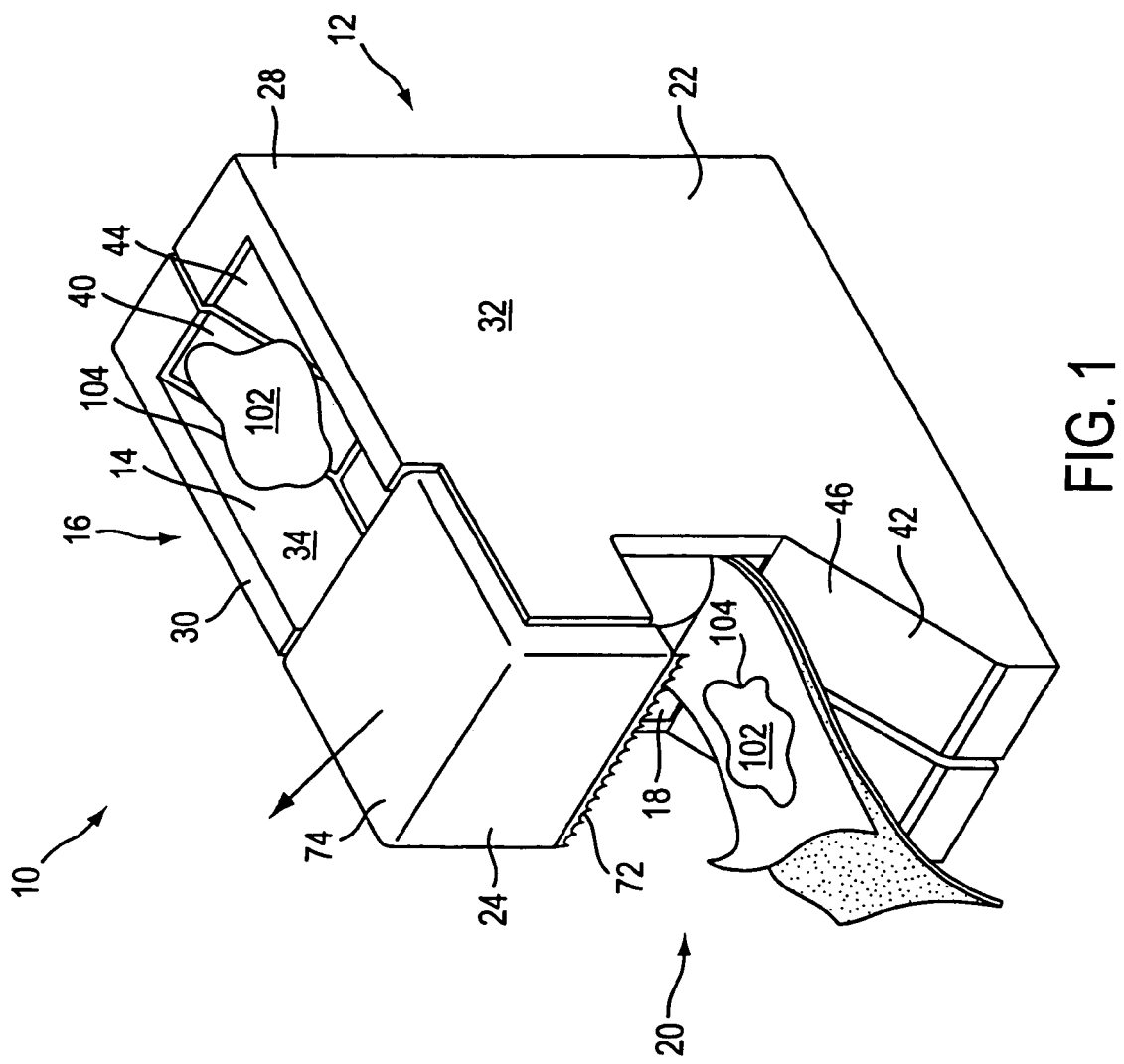
FIG. 1 is a perspective view of an adhesive transfer device constructed in accordance with one aspect of the present invention being used to apply pressure-sensitive adhesive to a selected substrate.
Figure 2:
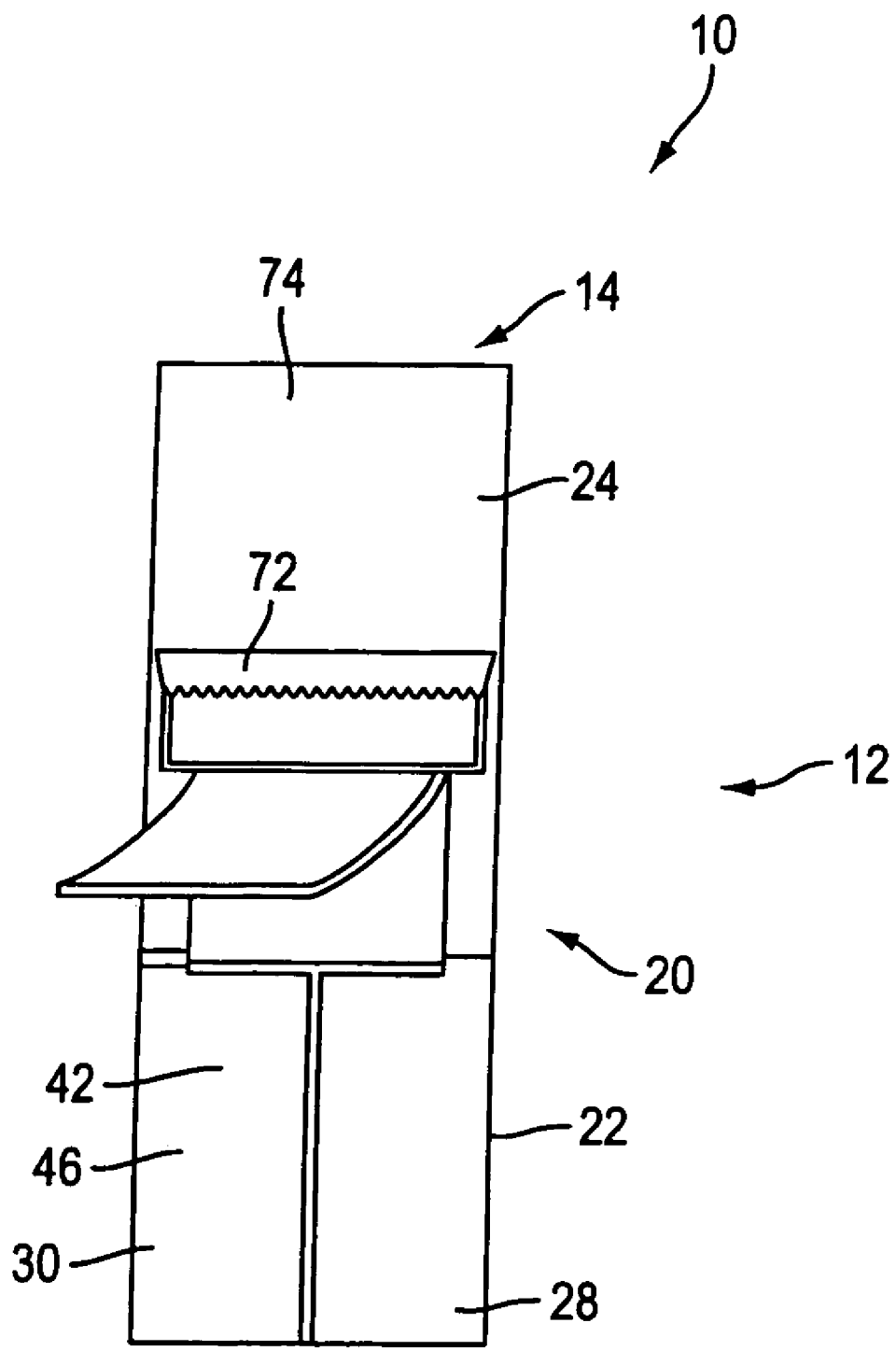
FIG. 2 is a front elevated view of the device of FIG. 1.

FIG. 1 shows a perspective view of an actuatorless, hand-held adhesive transfer device, generally indicated at 10, constructed in accordance with one aspect of the present invention. The device 10 comprises a frame, generally indicated at 12, that has a feeding opening 14 defined at a feeding side 16 thereof and a discharge opening 18 defined at a discharge side 20 thereof. The frame 12 has a main frame portion 22 and a removable cartridge 24 that removably mounts within a cartridge receiving space 26 provided by the main frame portion 22 (FIG. 3). In the illustrated embodiment, the frame 12 is about 3 inches wide, 6 inches long and 6 inches high. However, these dimensions may be larger or smaller and the overall shape of the frame 12 may vary so long as the frame 12 is of suitable size to be accommodated in one hand of a person.

The main frame portion 22 is formed by coupling two halves 28, 30 together in a snap fit relation. As best seen in FIG. 3, the main frame portion 22 has a pair of opposing generally parallel side walls 32, 34, a bottom wall 36 extending generally perpendicularly and laterally between the side walls 32, 34, and a rear wall 38 extending generally perpendicularly and laterally between the side walls 32, 34. Further, the main frame portion 22 also has a pair of substrate supporting walls 40, 42 extending inwardly from the feeding and discharges sides 16, 20 thereof, respectively, at approximately 45° angles with respect to the bottom and rear walls 36, 38. As with the bottom and rear walls 36, 38, these supporting walls 40, 42 extend generally perpendicularly to and laterally between the side walls 32, 34. These substrate supporting walls 40, 42 each provide a substrate supporting surface 44, 46 that are in line with one another.

The main frame portion 22 also has a pair of cartridge supporting walls 48, 50 extending generally perpendicular to and laterally between the side walls 32, 34. These supporting walls 48, 50 extend generally perpendicular to and intersect with the substrate supporting walls 40, 42, respectively, and provide a pair of generally parallel cartridge guiding surfaces 52, 54 that intersect the substrate supporting surfaces 44, 46 at generally perpendicular angles. These cartridge guiding surfaces 52, 54 cooperate with interior surfaces on the side walls 32, 34 and interior surfaces on the bottom wall 36 to define the aforementioned cartridge receiving space 26.

The removable cartridge 24 comprises a pair of side walls 60, 62, an upper generally U-shaped wall 64, and a lower generally U-shaped wall 66. The leg portions of the U-shaped walls 64, 66 on the feeding side of the cartridge 24 provide a relatively narrow feeding opening 68 and the leg portions of the U-shaped walls 64, 66 on the discharge side of the cartridge 24 provide a relatively wide discharge opening 70. A serrated cutting blade 72 is fixedly mounted to the upper U-shaped wall 64 at the upper edge of the discharge opening 70. An L-shaped manually engageable wall structure 74 is fixedly mounted to the upper U-shaped wall 64. The removable cartridge 24 also has a substrate supporting wall 76 that extends generally perpendicularly to and laterally between the side walls 60, 62. When the cartridge 24 is inserted into the cartridge receiving space 26 of the main frame portion 22, the substrate supporting surface 78 of wall 76 is positioned generally in line with the substrate supporting surfaces 44, 46 of the main frame portion 22. Also, the rear edge of the L-shaped wall structure 74 cooperates with the edges of the side and rear walls 32, 34, 38 of the main frame portion 22 to define the feeding opening 14. Likewise, the bottom edge of the L-shaped wall structure 74 cooperates with edges of the side walls 32, 34 and substrate supporting wall 42 of the main frame portion 22 to define the discharge opening 18.

The removable cartridge 24 also has a first supply roll 80 and a second supply roll 82 rotatably mounted between the side walls 60, 62 thereof. The first supply roll 80 has a supply of an adhesive carrying substrate 84 wound up on a generally cylindrical core 86. The carrying substrate 84 has an adhesive carrying surface 88 coated with a layer of pressure-sensitive adhesive 83, such as an acrylic-based emulsion adhesive. The adhesive may be a single layer of permanent or repositionable adhesive or it may be constituted by multiple layers of permanent and repositionable adhesive, such as is disclosed in U.S. application of Neuburger, Ser. No. 09/343,676, filed Jun. 30, 1999. The second supply roll 82 has a supply of an adhesive mask substrate 90 wound up on a generally cylindrical core 92. The mask substrate 90 has a mask surface 94 that has a greater affinity for adhesive bonding than the adhesive carrying surface 88 of the carrying substrate 84. Alternatively, the mask substrate 90 may have a lower affinity for adhesive bonding that the adhesive carrying surface 88 of the carrying substrate 84. Preferably, the mask substrate 90 is a thin plastic film which is left uncoated to give it the higher affinity for adhesive bonding, or which is coated with a release material, such as silicone, to give it the lower affinity.

A pair of fixed generally cylindrical members 96, 98 extend between the side walls 60, 62 of the removable cartridge 24. The substrates 84, 90 are unwound from their respective supply rolls 80, 82, fed around these cylindrical members 96, 98, and fed through the discharge opening 70 of the cartridge 24.

The upper cylindrical member 96 may be considered a first substrate engaging structure that is associated with the first supply roll 80 and that provides a first substrate engaging surface in the form of the cylindrical member's exterior surface. The substrate supporting wall 76 in the cartridge 24 may be considered a second substrate engaging structure that is associated with the second supply roll 82 and that provides a second substrate engaging surface in the form of surface 78. The upper cylindrical member 96 and the substrate supporting wall 76 are spaced apart from one another so that the substrate engaging surfaces thereof define a relatively narrow substrate receiving slot 100 therebetween. Preferably, the maximum thickness of the slot 100 is 0.200 in. and the minimum thickness of the slot 100 is 0.010 in. The preferred thickness of the slot 100, however, is 0.050-0.060 in. The surfaces of the adhesive carrying and mask substrates 84, 90 opposite the carrying and mask surfaces 88, 94, respectively, slidably engage these first and second substrate engaging surfaces.

To perform an adhesive transfer operation using the device 10, the removable cartridge 24 is inserted into the cartridge receiving space 26 with the surface defining that space 26 supporting the cartridge 24 and restricting the cartridge 24 against relative movement within the main frame portion 22. The lead end portions of the carrying and mask substrates 84, 90 extend outwardly from the discharge side 20 of the frame 12. By inserting the cartridge 24 into space 26 as shown, the substrate receiving slot 100 is positioned with respect to the main frame portion 22 such that the adhesive transfer operation can be initiated by manually grasping the frame 12 in one hand and inserting a lead edge portion of a selected substrate 102 between the adhesive carrying and mask substrates 84, 90 into the substrate receiving slot 100.

The upper cylindrical member 96 and the substrate supporting wall 76 are constructed and arranged such that the adhesive transfer operation can be continued while continuing to grasp the frame 12 in a one-handed manner by manually grasping the lead end portions of the adhesive carrying and mask substrates 84, 90 at the discharge side 20 of the frame 12 and manually pulling the lead end portions so as to advance the mask, adhesive carrying, and selected substrates 90, 84, 102 together through the substrate receiving slot 100 and outwardly through the discharge opening 18 from the discharge side 20 of the frame 12. The substrate receiving slot 100 functions as a pressure applying structure and is configured such that the first and second substrate engaging surfaces apply pressure to the substrates advancing through the slot 100, thereby causing the pressure-sensitive adhesive on the carrying surface 88 of the carrying substrate 84 to bond to both the selected substrate 102 and any portions of the mask surface 94 of the mask substrate 90 extending around a peripheral edge 104 of the selected substrate 102. More specifically, the combined thickness of the substrates 84, 90, 102 and the adhesive layer 83 causes the mask and carrying substrates to be pressed against the first and second substrate engaging surfaces of the upper cylindrical member 96 and the substrate supporting wall 76 that defines the slot 100 so as to compress the substrates 84, 90, 102 together and cause the pressure-activated bonding of the adhesive 83.

After the selected substrate 102 has been manually pulled out through the discharge opening 18 along with the carrying and mask substrates 84, 90, the substrates can then be pulled upwardly so as to bring the carrying and mask substrates 84, 90 into contact with the serrated blade 72. This severs the discharged portions of these substrates 84, 90 from the remainder of the substrate material left connected to the supply rolls 80, 82. Finally, the adhesive mask substrate 90 can be peeled back from the carrying substrate 14 to expose the selected substrate 102.

Because the mask surface 94 of the mask substrate 90 has a greater affinity for adhesive bonding than the carrying surface 88 of the adhesive mask substrate 84, any of the excess adhesive 83 bonded to the mask surface 94 will remain bonded to the mask surface 94 and be removed from the adhesive carrying substrate 84. The mask substrate 90 can then be discarded along with the excess adhesive bonded thereto. This leaves the selected substrate 102 bonded to the carrying surface 88 of the carrying substrate 84 with substantially no excess adhesive exposed around the periphery of the selected substrate 102. The selected substrate 102 can then be peeled back from the carrying substrate 84, taking the adhesive thereon along with it, for adherence as desired to any suitable surface.

Preferably, the carrying surface 88 is treated with a release material, such as a silicone coating or the like, to ensure that it has a lower affinity for adhesive bonding than the selected substrate 102 and that the adhesive 83 is taken along with the selected substrate 102 when it is peeled back.

In an arrangement where the mask surface 94 has a lower affinity for adhesive bonding than the adhesive carrying surface 88, the mask substrate 90 simply serves to cover and protect both the selected substrate 102 and the excess adhesive. The mask substrate 90 does not serve to strip away the excess adhesive from around the periphery of the selected substrate 102.

The use of the cartridge 24 provides for easy removal and replacement of both supply rolls 80,82 in a single operation as opposed to removably mounting each supply roll separately.

Although the embodiment illustrated in a cartridge-based unit, it is to be understood that the principles of the present invention may be practiced in a device that uses individually mounted feed rolls or in a disposable-type device where the entire device is discarded rather than replacing the supplies using a cartridge. In fact, the cartridge 24 disclosed may be used to practice the principles of the present invention separate from the main frame portion 22. However, the use of the main frame portion 22 is preferred to provide the user with both a larger grasping surface and the substrate supporting surfaces 44, 46 for easier usage.

The use of rigid structures defining the slot 100 as the pressure applying structure is advantageous because such structures can be provided in the device 10 at a relatively low cost. Alternatively, a pair of freely rotating nip rollers could be used as the pressure applying structure. The nip rollers could be fixed relative to one another or spring biased toward one another. For reference with respect to these alternatives, see the above-incorporated '962 patent, '417 patent, and/or '587 application. As another alternative, the adhesive carrying substrate could be wound with the adhesive thereon facing radially outwardly and one or more biasing elements, such as springs or tensioned roller bands, could be used as the pressure applying structure to press the supply rolls together. This pressed engagement creates the requisite pressure for applying the adhesive to the selected substrate 102. Reference may be made to U.S. Provisional Appln. of Miller, entitled Low Cost Adhesive Transfer Device, filed Oct. 2, 2000, the entirety of which is hereby incorporated into the present application by reference for all purposes.

Figure 5:
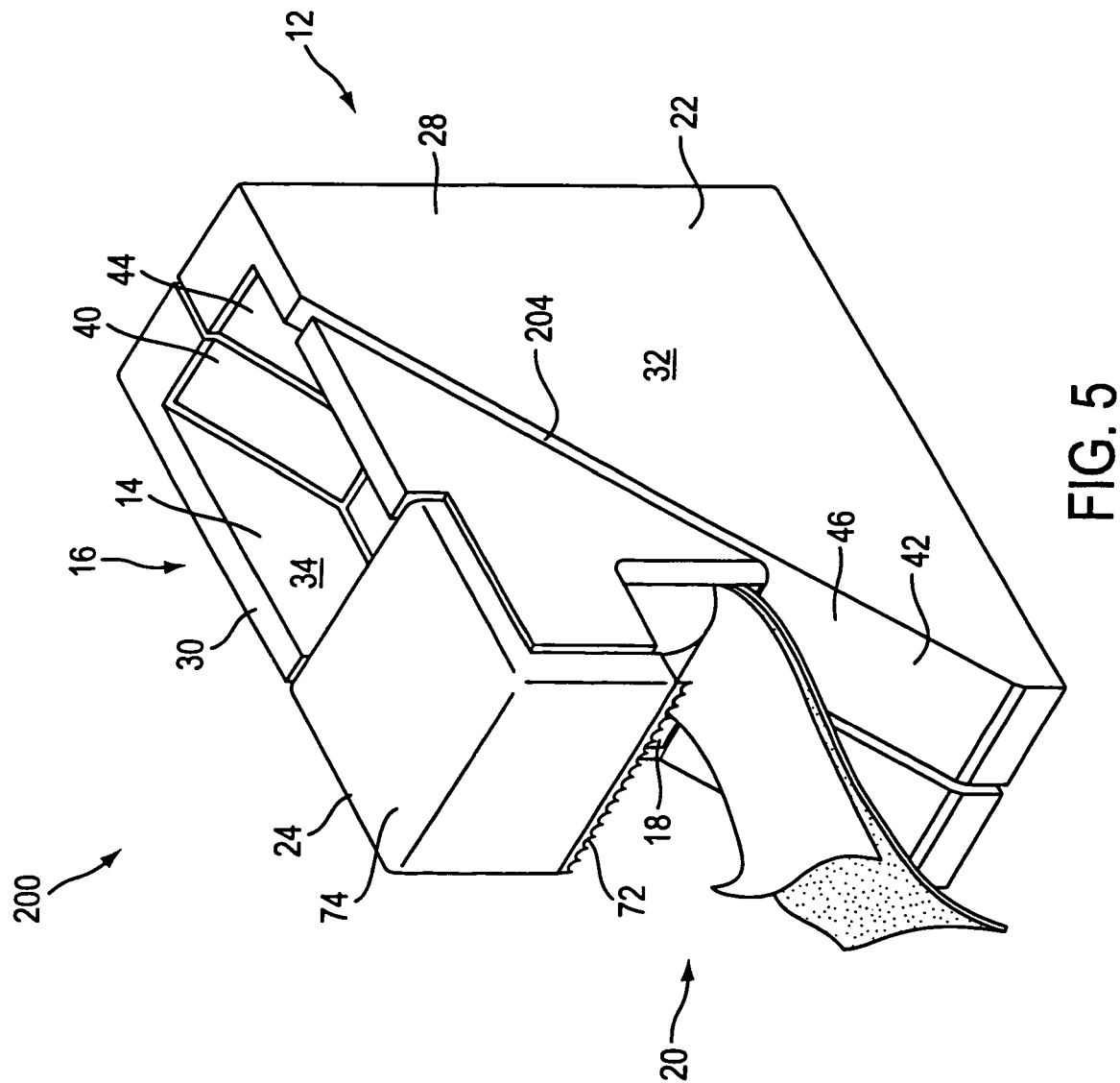
FIG. 5 shows a perspective view of an adhesive transfer device constructed in accordance with another aspect of the present invention.

FIG. 5 shows a device 200 constructed in accordance with the principles of a second aspect of the invention. The construction of the device 200 is substantially identical to the one shown in FIGS. 1-4 with certain exceptions which are discussed hereinbelow. Thus, corresponding structures in these two devices 10, 200 will be denoted with identical reference numbers.

Figure 6:
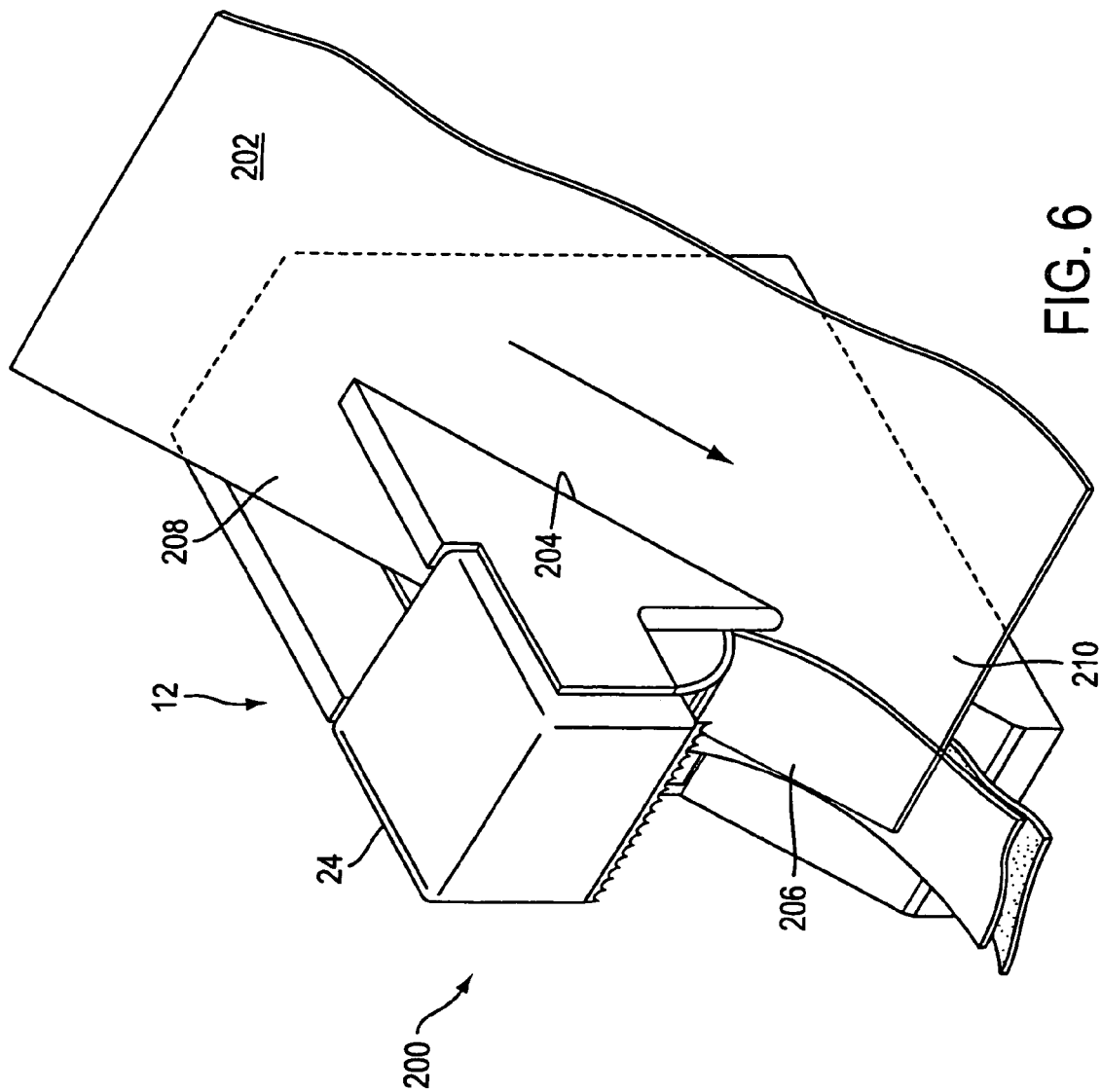
FIG. 6 is a perspective view of the device of FIG. 5 showing the device being used to apply pressure-sensitive adhesive to the side edge portion of a selected substrate.

The device 200 is designed for applying adhesive to the edge portions of selected substrates, such as the one shown at 202 in FIG. 6. This is particularly advantageous for adhesively mounting large selected substrates without wasting adhesive because the adhesive can be applied where it counts most—at the edges—rather at the central area of the substrates.

The device 200 has a substrate receiving opening in the form of an elongated slot 204 that extends form the feeding side 16 of the frame 12 to the discharge side 20 of the frame 12. Specifically, the slot 204 opens at one end thereof to the feeding opening 14 and at the other end thereof to the discharge opening 18. Likewise, the cartridge 24 has a slot (not shown) formed in side wall 60 thereof that aligns with the slot 204. These slots are oriented so that they extend between the supply rolls 80, 82 and the first and second substrate structures provided by upper cylindrical member 96 and substrate supporting wall 76 in the lateral direction of the device 200. In particular, these slots align with the substrate receiving slot 100 in the lateral direction of the device 100.

The adhesive transfer operation is performed by inserting a corner portion 206 of the selected substrate 202 through the slot 204 from the feeding side 16 of the frame 12 into the substrate receiving slot 100 with a portion of the substrate 202 extending outwardly from the slot 204 to the exterior of the frame 12. The corner portion 206 is the portion at which a side edge portion 208 and a lead edge portion 210 of the substrate 202 intersect.

The transfer operation can be continued by advancing the mask substrate 90, the adhesive carrying substrate 84, and the selected substrate together through the substrate receiving slot 100 and the slot 204 and outwardly from discharge site 20 of the frame 12. The surfaces defining the substrate receiving slot 100 apply pressure to the substrates 84, 90, 202 as they advance through the substrate receiving slot 100, thereby causing the pressure-sensitive adhesive on the carrying substrate 84 to bond to both the side edge portion 208 of the selected substrate 202 and any portions of the mask surface 94 of the mask substrate 90 extending around the periphery of the side edge portion 208.

The substrates 84, 90 discharged from the discharge opening 20 can then be cut using the blade 72 as described above. Then, the mask substrate 90 can be peeled apart from the selected substrate 202 and the carrying substrate 84. As a result, any excess adhesive bonded to the mask substrate 90 is removed from the carrying substrate 84, thereby leaving the side edge portion 208 bonded to the carrying substrate 84 with substantially no adhesive exposed around the side edge portion 208 of the selected substrate 202. Then, the side edge portion 208 can be peeled back from the carrying substrate 84 and adhered to a surface as desired.

The adhesive transfer operation described above may be repeated for each edge of the selected substrate 202 to provide the substrate 202 with a peripheral border of adhesive along the edges thereof.

It should be noted that the use of the substrate receiving opening 204 is not limited to specific embodiment disclosed herein and it may be used on any type of adhesive transfer device, including any of the patents and patent applications incorporated herein. For example, the opening 204 could be formed in the frame wall of a power-operated desktop adhesive transfer device, or one that operates under manual power by a hand crank actuator.

The principles of the invention may be practiced in a device that does not have substrate engaging structures for applying pressure to the substrates, and instead may be practiced in a device having any kind of pressure applying structure suitable for applying the requisite pressure for affecting adhesive transfer. For example, the adhesive carrying substrate could be wound with the adhesive thereon facing radially outwardly and one or more biasing elements, such as springs or tensioned rubber bands, could be used as the pressure applying structure to press the supply rolls together. This pressed engagement creates the requisite pressure for applying the adhesive to the selected substrate 102. Reference may be made to the above-incorporated U.S. Provisional Appln. of Miller.

It can thus be appreciated that the objects of the present invention have been fully and effectively accomplished by the foregoing specific embodiments. It is to be understood, however, that the preferred specific embodiments have been provided solely to illustrate the structural and functional principles of the present invention and are not intended to be limiting. To the contrary, the principles of the present invention are intended to encompass all modifications, alterations and changes within the spirit and scope of the appended claims.

Any patents and patent applications mentioned herein and not specifically incorporated into the present application are hereby incorporated into the present application by reference.

What is claimed is:

1. A method for performing an adhesive transfer operation wherein adhesive is applied to a selected substrate, said method comprising:

providing a selected substrate to which adhesive is to be applied;

providing a hand-held actuatorless adhesive transfer device comprising:

a frame having a feeding side and a discharge side, said frame being sized and configured to be received in one hand of a user for manual handling and transport;

a first supply roll rotatably mounted to said frame, said first supply roll carrying a wound up supply of an adhesive carrying substrate that has an adhesive carrying surface coated with a layer of pressure-sensitive adhesive;

a second supply roll rotatably mounted to said frame, said second supply roll carrying a wound up supply of an adhesive mask substrate;

said adhesive carrying substrate being unwound from said first supply roll with a lead end portion thereof extending outwardly from the discharge side of said frame;

said mask substrate being unwound from said second supply roll with a lead end portion thereof extending outwardly from the discharge side of said frame adjacent the lead end portion of said carrying substrate;

said frame being constructed and arranged to enable the adhesive transfer operation to be initiated by manually grasping said frame with one hand and inserting a leading edge portion of the selected substrate between said adhesive carrying and mask substrates; and pressure applying structure constructed and arranged to apply pressure to substrates being advanced through said device;

while manually grasping the frame with one hand, inserting the leading edge of selected substrate between said adhesive carrying and mask substrates;

while continuing to manually grasp said frame in one hand, manually grasping the lead end portions of said adhesive carrying and mask substrates of the discharge side of said frame with the other hand; and while continuing to manually grasp said frame in one hand, manually pulling said lead end portions with the other hand so as to advance said mask, adhesive carrying, and selected substrates together through said device and outwardly from the discharge side of said frame such that said pressure applying structure applies pressure to said substrates being advanced through said device, thereby causing the pressure-sensitive adhesive on said carrying substrate bonds to the selected substrate.

2. A method according to claim 1, wherein said mask substrate has a mask surface that engages the selected substrate and that has a greater affinity for adhesive bonding than the adhesive carrying surface of said adhesive carrying substrate; said method further comprising:

after said selected substrate has advanced outwardly from the discharge side of said frame, peeling said adhesive carrying and mask substrates apart from one another so that any portions of the adhesive bonded to the mask surface remains bonded thereto and are removed from said adhesive carrying substrate, thereby leaving said selected substrate bonded to said carrying substrate with substantially no adhesive exposed around the periphery of said selected substrate so that said selected substrate can be peeled back from said carrying substrate and bonded to a surface as desired.

3. A method according to claim 1, wherein said pressure applying structure comprises a first substrate engaging structure provided on said frame and a second substrate engaging structure provided on said frame; said adhesive carrying substrate being unwound from said first supply roll and advanced between said substrate engaging structures with a surface thereof opposite said adhesive carrying surface engaging said first substrate engaging structure; said adhesive mask substrate being unwound from said second supply roll and advanced between said substrate engaging structures with a surface thereof opposite said adhesive mask surface engaging said second substrate engaging structure;

wherein advancing said substrates through said device includes advancing said substrates between said first and second substrate engaging structures such that said engaging structures apply pressure to said substrates to thereby cause the pressure-sensitive adhesive to bond to the selected substrate as aforesaid.

* * * * *